US010740501B2

(12) United States Patent
Singh et al.

(10) Patent No.: US 10,740,501 B2
(45) Date of Patent: Aug. 11, 2020

(54) PRODUCT CUSTOMIZATION

(71) Applicant: NIKE, Inc., Beaverton, OR (US)

(72) Inventors: Vikrant Singh, Portland, OR (US); Adam Tenuta, Portland, OR (US); Ian Coyle, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 522 days.

(21) Appl. No.: 15/458,744

(22) Filed: Mar. 14, 2017

(65) Prior Publication Data

US 2017/0270224 A1 Sep. 21, 2017

Related U.S. Application Data

(60) Provisional application No. 62/308,833, filed on Mar. 15, 2016.

(51) Int. Cl.
| | |
|---|---|
| G06F 17/50 | (2006.01) |
| G06F 30/00 | (2020.01) |
| G06Q 30/06 | (2012.01) |
| G06F 119/18 | (2020.01) |

(52) U.S. Cl.
CPC ......... *G06F 30/00* (2020.01); *G06Q 30/0621* (2013.01); *G06Q 30/0643* (2013.01); *G06F 2119/18* (2020.01)

(58) Field of Classification Search
CPC . G06F 17/50; G06Q 30/0621; G06Q 30/0643
USPC .......................................................... 703/1
See application file for complete search history.

(56) References Cited

U.S. PATENT DOCUMENTS

| | | | |
|---|---|---|---|
| 5,663,746 A | 9/1997 | Pellenberg et al. | |
| 10,354,304 B2* | 7/2019 | Stump | B33Y 50/00 |
| 2008/0163054 A1* | 7/2008 | Pieper | G06Q 30/00 |
| | | | 715/706 |
| 2009/0254971 A1* | 10/2009 | Herz | G06Q 10/10 |
| | | | 726/1 |
| 2014/0201024 A1 | 7/2014 | Collier et al. | |

OTHER PUBLICATIONS

Jun. 9, 2017—(WO) ISR & WO—App. No. PCT/US17/022477.
Anonymous: "Audi launches world's first Kinect-powered car dealership in London : Stuff", Jul. 16, 2012 (Jul. 16, 2012), pp. 1-7, XP55377960, Retrieved from the Internet: URL:https://www.stuff.tv/news/audi-launches-worlds-first-kinect-powered-car-dealership-in-london [retrieved on Jun. 1, 2017].

* cited by examiner

*Primary Examiner* — Andre Pierre Louis
(74) *Attorney, Agent, or Firm* — Banner & Witcoff, Ltd.

(57) ABSTRACT

Systems and methods for designing and customizing tangible products are disclosed. Examples may include apparel, such as footwear, shirts, or sporting goods, athletic equipment and/or electronic devices, including but not limited to activity monitoring devices or media devices. Aspects relate to customizing products based on visual and tactile properties of the materials to be utilized in the design and construction of the product. Both the visual and tactile property selections may be displayed to the consumer to on an exemplary graphical representation of the product. Embodiments allow a user to select and review both visual and tactile properties of the product, thus the consumer is able to visualize and touch the materials of a customized product.

18 Claims, 14 Drawing Sheets

PRODUCT CUSTOMIZATION

This application is a non-provisional of and claims priority to U.S. Provisional Application No. 62/308,833, filed Mar. 15, 2016, which prior application is incorporated herein by reference in its entirety for any and all non-limiting purposes.

BACKGROUND

The present disclosure relates to an apparatus, system, method, and computer generated user interfaces for designing of (e.g., customization of) consumer products, such as articles of footwear, articles of apparel, athletic equipment (e.g., bags, gloves, watches, socks, uniforms, protective equipment, pads, team gear, etc.).

Recent years have ushered in dramatic advancements in electronic computing devices and their capabilities, including dramatic advances in the information readily available to such devices (e.g., over the internet or other networked connections) and communications capabilities between such devices. The present disclosure provides for an apparatus and system for designing and customizing products by users. While there are systems for customizing products, often virtual representations of products are merely overlays of simple color wheels over a product. Further, if users select a color for the virtual representation, its appearance will be based on the user's display device setting, lighting, and/or the settings of the capture device capturing the product and/or color to overlay. The display may also inaccurately show a texture or reflectivity of a material that does not accurately capture the actual material of a product or part of it.

The current disclosure is directed towards systems and methods to overcome one or more of the deficiencies above as well as others in the art.

SUMMARY

Various aspects of this disclosure relate to systems and methods for designing and/or customizing consumer products. Products may be any tangible item, examples may include but are not limited to: items of apparel, such as shirts, bands, or footwear. In yet other embodiments, the items may be electronic, such as activity monitors, display devices, or personal media players. In one embodiment, a user's computing device (which may be mobile, stationary, and/or located in a commercial or private setting) may comprise one or more non-transitory computer-readable mediums that comprise computer-executable instructions that when executed by a processor, cause the processor to generate a user interface that displays a rendering, such as a depiction of a 3-D representation on a 2-D display device, of the product being designed as the design is being made. In other embodiments, a 3-D model may be rendered. The computer executable instructions provide systems and methods and accept users' input for product (e.g., footwear) design. In and embodiment, a user may customize various aspects of an article of footwear such as the upper, midsole, logo or other structural elements of the article of footwear.

While described above in conjunction with articles of footwear, aspects of this invention also may be practiced in conjunction with design of other products, such as other apparel (including athletic apparel, uniforms, etc.) and athletic equipment (such as balls, bats, gloves, bags, protective equipment, team gear, pads, hockey sticks, watches, socks, etc.), or electronic devices. Indeed, the scope of this disclosure is not limited to any type of product.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example Personal Training System

A. Illustrative Networks

Figure 1:
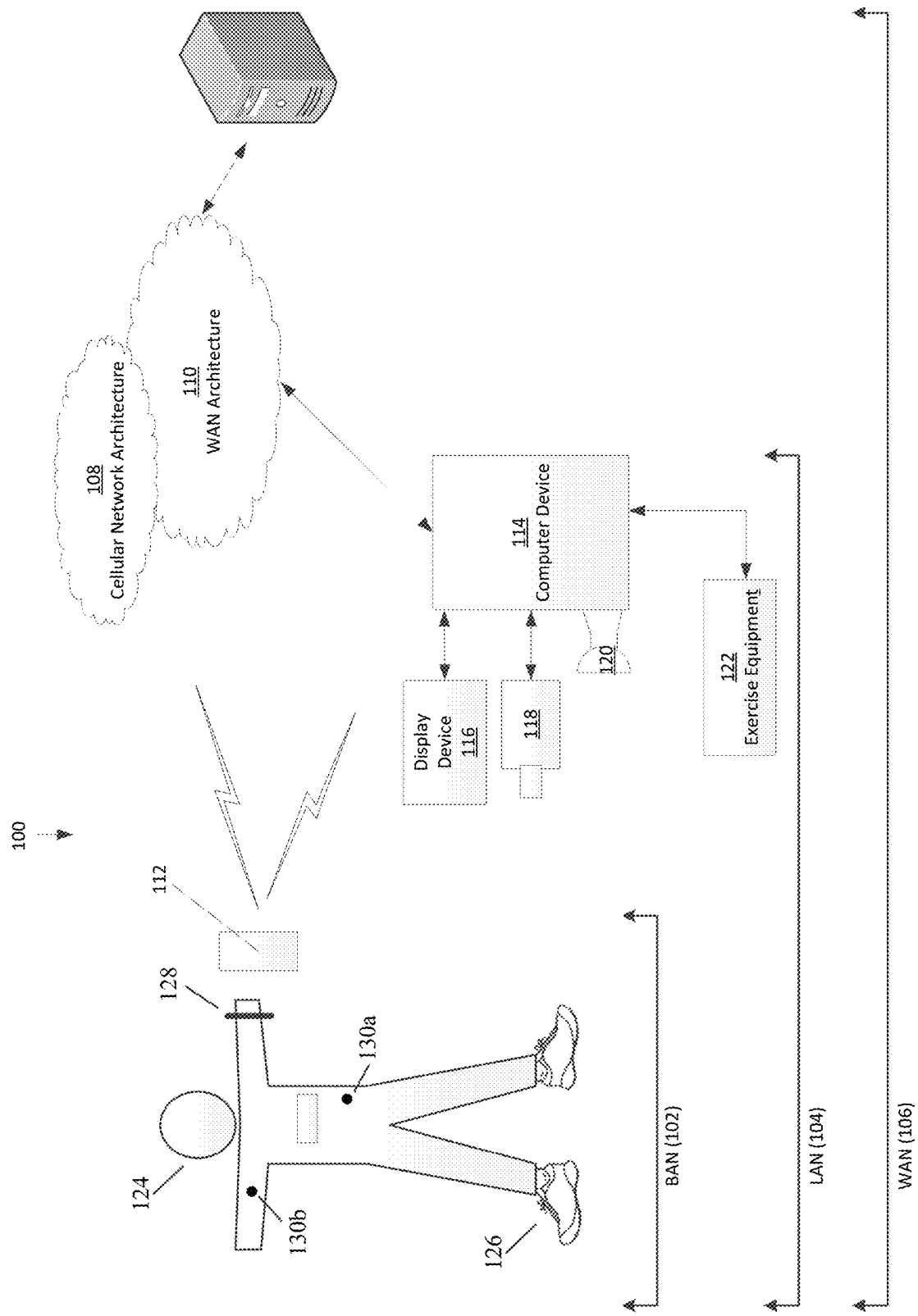
FIG. 1 illustrates an example system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
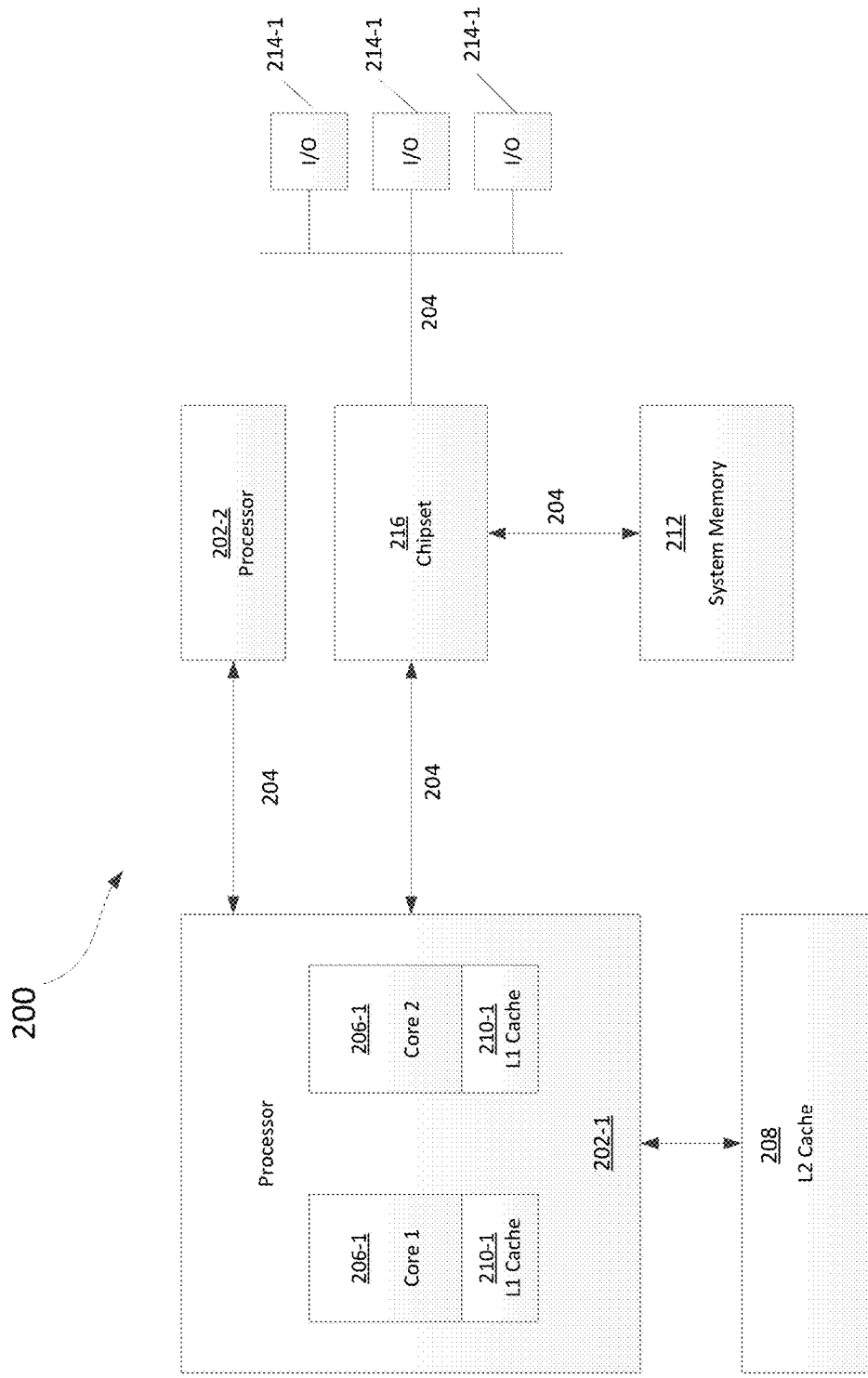
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, Calif. or Zune® or Microsoft® Windows devices available from Microsoft of Redmond, Wash. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-Mounted Device

Figure 3:
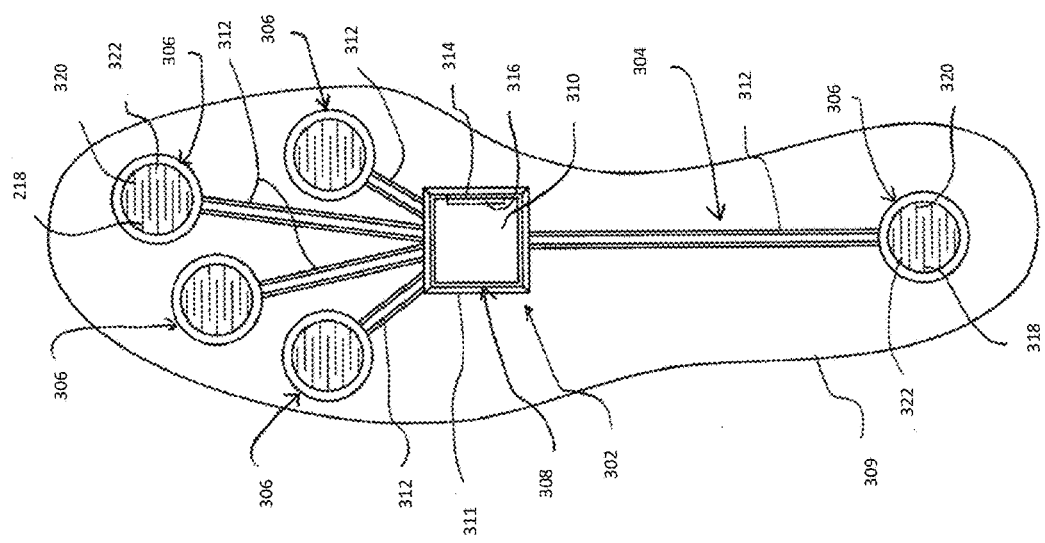
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-Worn Device

Figure 4:
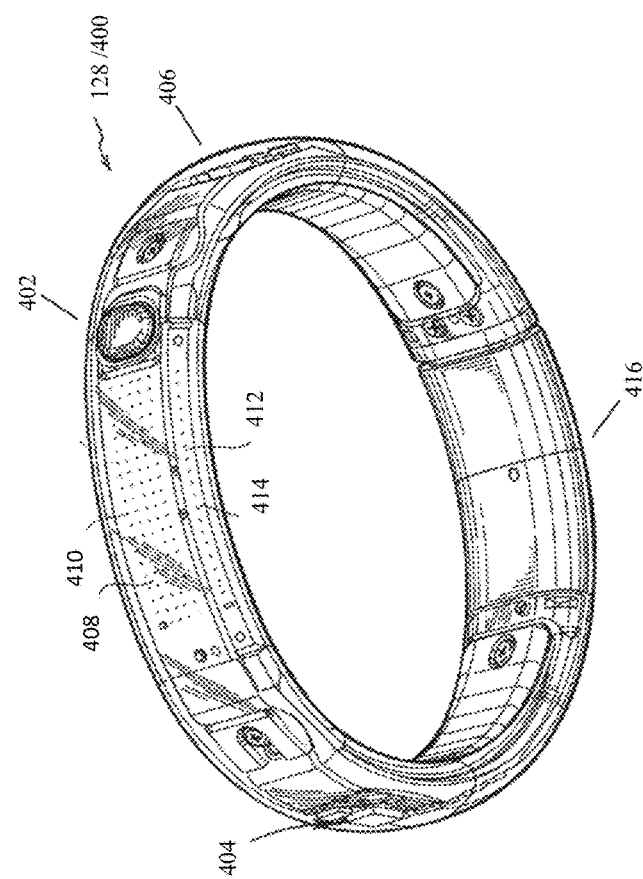
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130*a* and 130*b* may be sensors integrated into apparel, such as athletic clothing. Such sensors may be placed at any desired location of the body of user 124. Sensors 130*a/b* may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
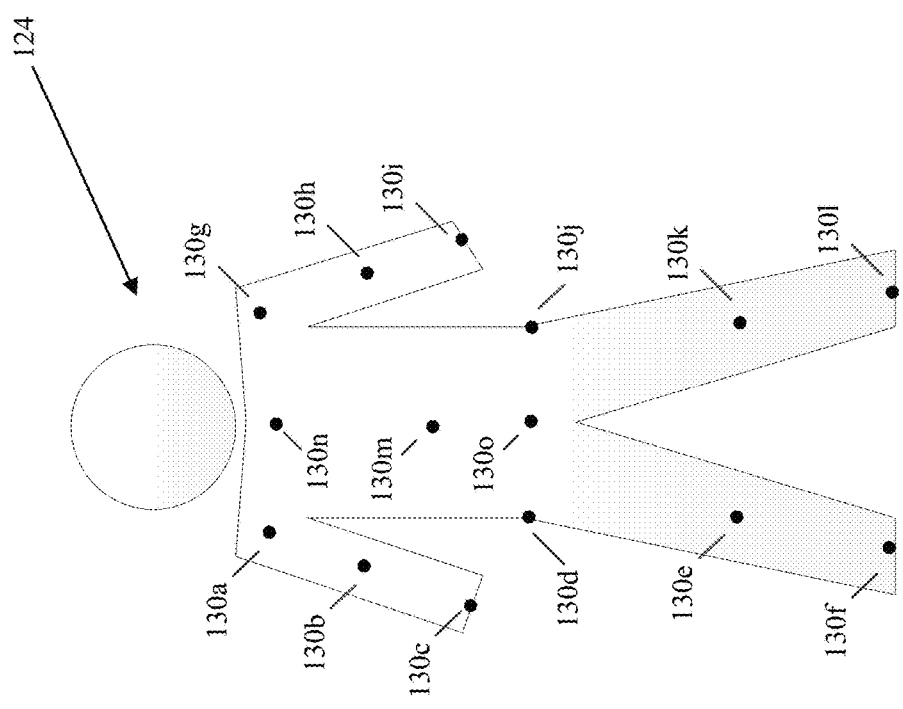
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130*a*-130*o*). In this regard, sensors may be physical sensors located on/in a user's clothing, yet in other embodiments, sensor locations 130*a*-130*o* may be based upon identification of relationships between two moving body parts. For example, sensor location 130*a* may be determined by identifying motions of user 124 with an image-capturing device, such as image-capturing device 118. Thus, in certain embodiments, a sensor may not physically be located at a specific location (such as one or more of sensor locations 130*a*-130*o*), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130*m* may be utilized in a determination of the user's center of gravity (a.k.a, center of mass). For example, relationships between location 130*a* and location(s) 130*f*/130*l* with respect to one or more of location(s) 130*m*-130*o* may be utilized to determine if a user's center of gravity has been elevated along the vertical axis (such as during a jump) or if a user is attempting to "fake" a jump by bending and flexing their knees. In one embodiment, sensor location 130*6n* may be located at about the sternum of user 124. Likewise, sensor location 130*o* may be located approximate to the naval of user 124. In certain embodiments, data from sensor locations 130*m*-130*o* may be utilized (alone or in combination with other data) to determine the center of gravity for user 124. In further embodiments, relationships between multiple sensor locations, such as sensors 130*m*-130*o*, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130*m*-130*o* may serve as a point for a center of moment location of user 124. In another embodiment, one or more locations may serve as a center of moment of specific body parts or regions.

Figure 6A:
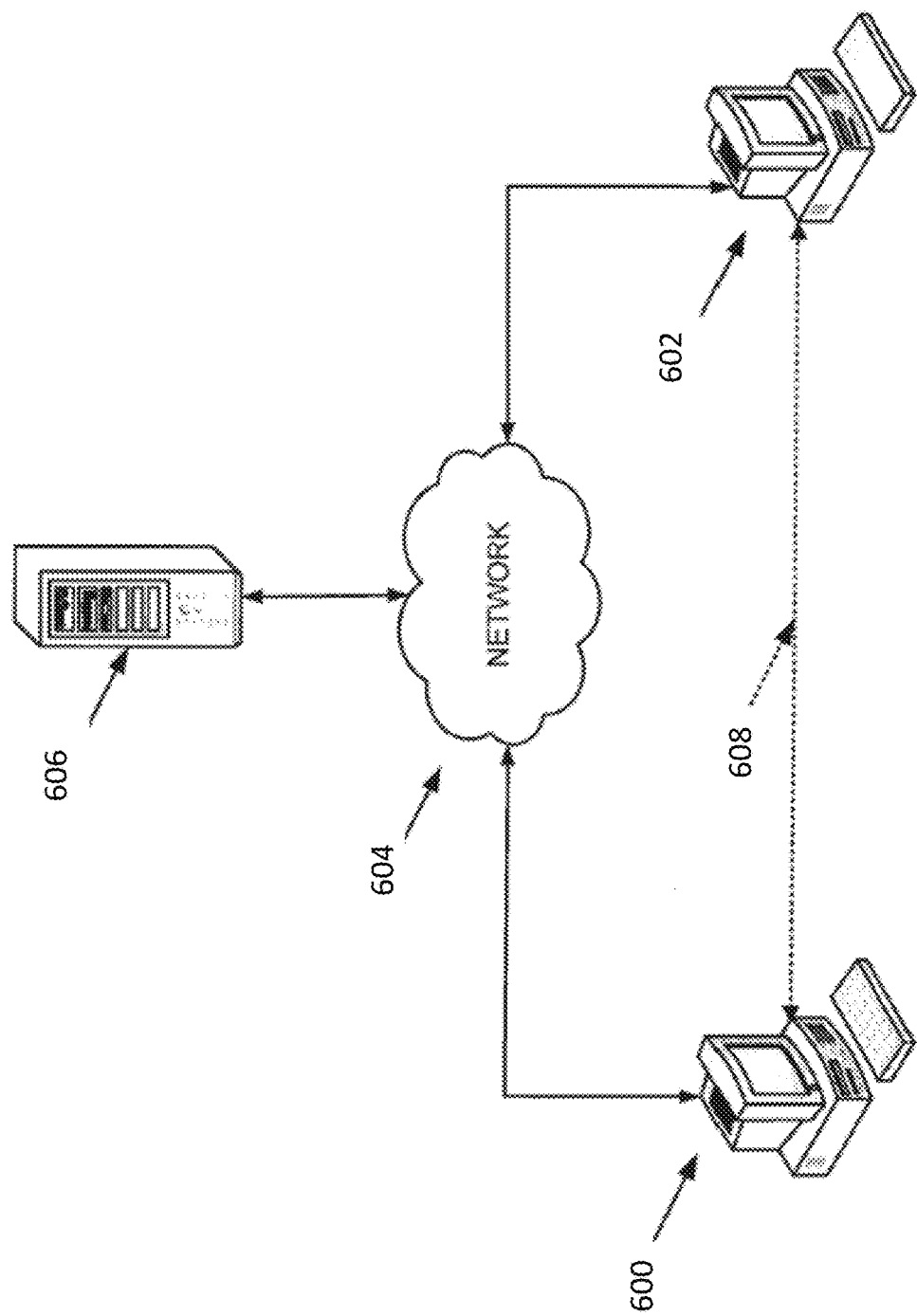
FIGS. 6A through 6C illustrate various examples of hardware and overall networking systems that may be used to implement various examples of the disclosure.
Figure 6B:
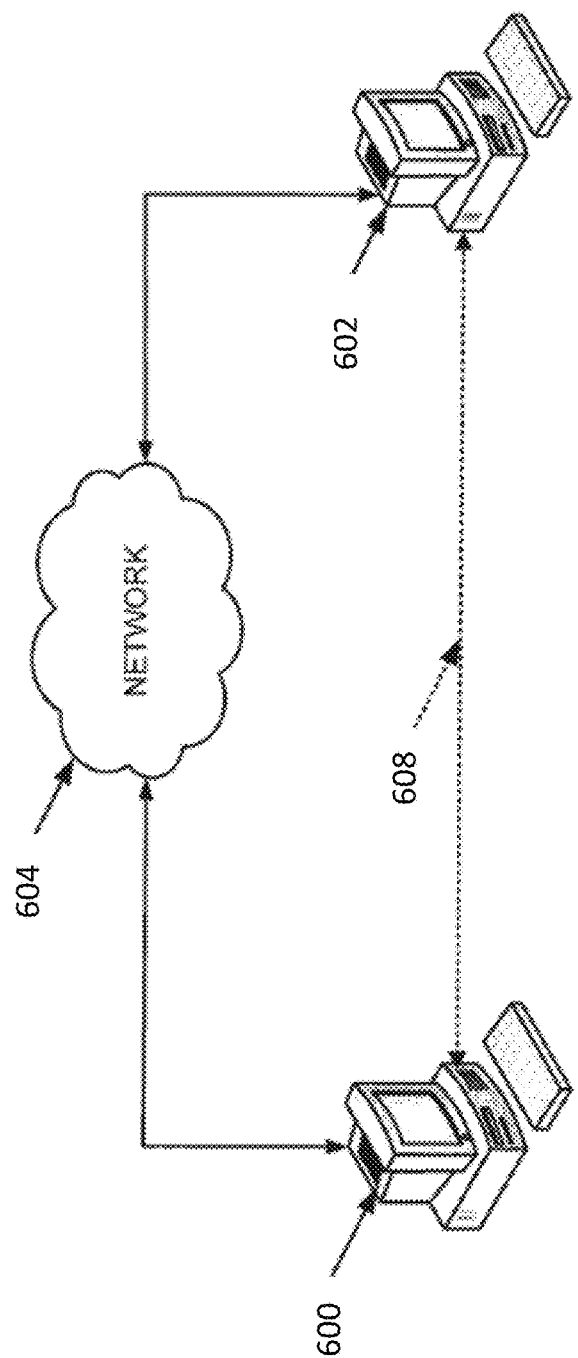
Figure 6C:
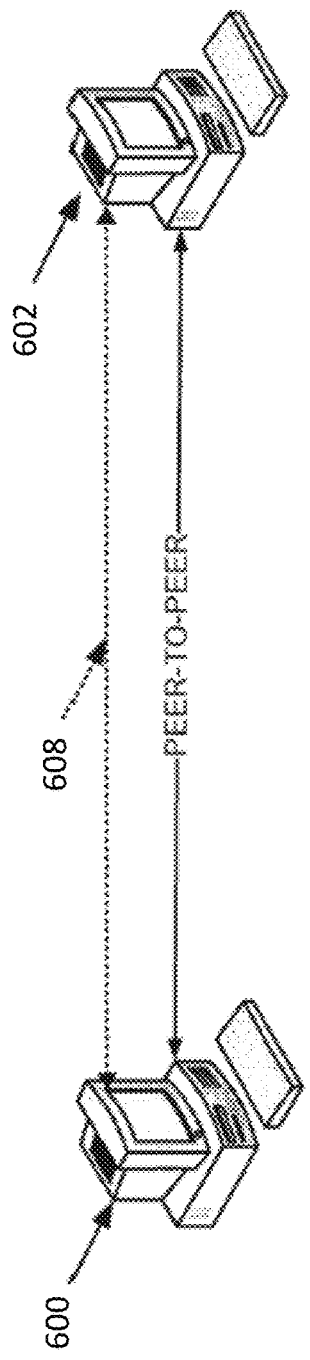

FIGS. 6A through 6C illustrate various examples of hardware systems on which systems and user interfaces according to this disclosure that may be implemented and on which methods according to this disclosure may be practiced. In an embodiment, multiple users may work together on a design to implement a customized product.

FIG. 6A shows a first computing device 600 and a second computing device 602 connected and in communication with one another via a network 604, such as via an internet connection, via a local area network (LAN), via a wide area network (WAN), etc. The two computing devices 600 and 602 may be located remotely from one another. As shown in FIG. 6A, the two computing devices 600 and 602 each establish a communication channel within the network 604 and communicate with a messaging server system 606 (comprising one or more server computers) that provide at least shared collaboration data used to change the design (as will be described in more detail below) between the computing devices 600 and 602. Any desired communication link and communication protocol may be used to provide and control the data exchange between computing devices 600 and 602. If desired, this same server system 606 may provide communication data between the users on the computing devices 600 and 602 (such as textual message data, webcam data, etc.) as will be described in more detail below. Alternatively, if desired, a separate communication link 608 may be provided to support transfer of communication data between the computing devices 600 and 602.

In an embodiment, a user may access a design from multiple computers to work on the design from different locations. For instance, a design may be started on one computing device and modified at a later time on a second computing device.

Any desired types of computing devices 600 and 602 may be used without departing from this disclosure, such as any computing device capable of establishing a networked connection and/or a peer-to-peer connection and capable of providing the necessary display, user interface, and input capabilities, as will be described in more detail below. Some more specific examples of computing devices 600 and 602 that may be used in systems and methods in accordance with at least some examples of this disclosure include, but are not limited to: desktop computers, personal computers, laptop computers, palmtop computers, handheld computers, cellular telephones, personal digital assistants, computer workstations, televisions, and the like. Notably, collaborative design in accordance with examples of this disclosure may include any desired number of collaborators (e.g., any desired number of communicating computing devices 600, 602), and the various computing devices 600, 602, etc. may be in communication with the network 604 and the server system 606 in the same or different manners without departing from this disclosure. Moreover, the communicating computing devices 600, 602, etc. in a given collaboration session may be the same type or different types without departing from this disclosure (such as one desktop computer and one cellular telephone device), and the computing devices 600, 602, etc. may join in the collaborative session via the same communication channels or via different communication channels (e.g., both users may join the session through a common website portal (such as NIKEiD.com), or through different website portals (such as one user through NIKEiD.com and another user through a NIKEiD Facebook application, etc.).

Computing devices 600 and 602 that may be used in systems and methods in accordance with examples of this disclosure may include one or more input devices and a data processing system (e.g., including one or more microprocessors). Examples of input devices that may be included with computing devices 600, 602 include, but are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, any desired type of display device may be provided for use in conjunction with the computing devices 600, 602 of systems and methods according to this disclosure, including display devices integrated with the computing device 600, 602 itself or display devices separate from the computing devices 600, 602 but in communication therewith, such as projector displays, separate monitor displays, etc.

The computing devices 600 and 602 may be connected to the network 604 in any desired manner without departing from this disclosure, including in conventional manners that are known and used in the art, such as any conventional wired or wireless connection and using any network connection protocol. The communication channel connection 608 between the computing devices 600, 602 may be the same as or different from the collaborative data exchange connections without departing from this disclosure, and this connection 608 may include technology that is conventional and known in the art. In addition to various computer-to-computer communication links that are known and used in the art for providing live, real time communications between two (or more) computers, the communication channel connection 608 further may include other types of communication channels between computers or users, such as an instant messaging channel, a peer-to-peer messaging channel, a conventional telephone connection (which may use different hardware from that involved in inputting and exchanging the collaboration data), etc. As another alternative, if desired, the users could be located in close proximity to one another and may be allowed to communicate directly, in a face-to-face conversation, without the need for a separate communication channel. The communication channel 608, when provided, may use all of the same hardware as involved in the collaborative data exchange, all different hardware, or a combination thereof (e.g., some users using the same hardware, others using different hardware, etc.).

As described above (and as will be described in more detail below), systems and methods in accordance with examples of this disclosure will provide a user interface display on the user's computing device 600, 602. This interface will allow the user to see the subject matter of the collaborative effort and will allow the user to introduce his/her input to the collaborative effort. The user interfaces on the various devices will be provided and controlled by one or more of the computing devices 600, 602 and/or by the server system 606, and data for generating, maintaining, and receiving input through the user interfaces will be generated and provided via computer readable media included as part of or associated with one or more of the computing devices 600, 602 and/or the server system 606. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

In the example overall system shown in FIG. 6A, the software for generating the user interface may reside on computer readable media present on or available to any one of computing device 600, computing device 602, or server system 606. Alternatively, if desired, the software, or at least some portion(s) thereof, may be reside on more than one of, or all of computing device 600, computing device 602 (as well as any other computing device included in a collaboration session), or server system 606. The sever system 606 may be operated and maintained by the same organization(s) or individual(s) that operate and maintain at least one of the computing devices 600 and 602 and/or network 604, or the server system 606 may be operated, controlled, and maintained by a party separate from any or all of these entities. As some more specific examples, server system 606 may be operated and maintained (and the user interface software also may be operated and maintained) by one or more entities whose products are being marketed through the collaborative designing and/or shopping systems and methods described below (e.g., a manufacturer, a retailer, a vendor selected by a manufacturer or retailer, etc.).

Another example overall collaborative system set up is illustrated in FIG. 6B. While the overall network features 604 may be the same as or similar to those described above in conjunction with FIG. 6A (e.g., LAN, WAN, internet, etc.), in this example set up, the separate and independent server system 606 is omitted. Rather, in the setup of FIG. 6B, at least one of the two computing devices 600, 602 (and optionally both computing devices 600, 602) drives the collaborative data exchange communications and includes the software for generating and controlling the user interface. Also, if desired, one of the computing devices 600, 602 (or others) in the collaborative session may be designated as the "leader," which will then act as the conduit and controller through which communications to the others in the session can flow.

If desired, the networked communication between the users to exchange collaborative data may include features that allow the users to communicate with one another about the design. Alternatively, as shown in FIG. 6B, a separate user communication link 608 is illustrated. In addition to various computer-to-computer communication links that are known and used in the art for providing live, real time communications between two (or more) computers, the communication channel connection 608 further may include other types of communication channels between computers or users, such as an instant messaging channel, a peer-to-peer messaging channel, a conventional telephone connection (which may use different hardware from that involved in inputting and exchanging the collaboration data), etc. As another alternative, if desired, the users could be located in close proximity to one another and may be allowed to communicate directly, in a face-to-face conversation, without the need for a separate communication channel 608. The communication channel 608 may use the same or different hardware from that used in the collaborative data exchange.

Collaboration sessions and data exchange for collaborative design or shopping also may take place, in at least some systems and methods in accordance with this disclosure, via direct communication between computing devices in a peer-to-peer manner, as shown in FIG. 6C. Any desired hardware and/or protocols for this type of peer-to-peer communication may be used without departing from this disclosure, including conventional hardware and protocols as are known and used in the computer communications art. Also, as with the examples of FIGS. 6A and 6B described above, a separate user communication channel connection 608 may be provided (e.g., for instant messaging, additional peer-to-peer messaging, a conventional telephone connection (which may use different hardware from that involved in inputting the collaboration data), etc.). The various other alternatives as described above for FIGS. 6A and 6B also may be used in the setup of FIG. 6C without departing from this disclosure.

Figure 7A:
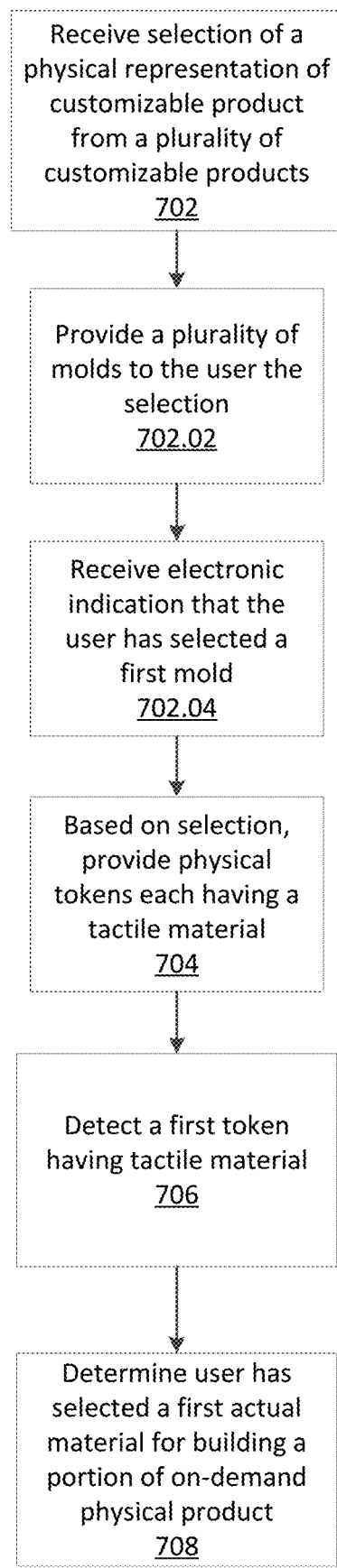
FIGS. 7A and 7B show a flow diagram illustrating that may be implemented to customize products based in accordance with one embodiment.
Figure 7B:
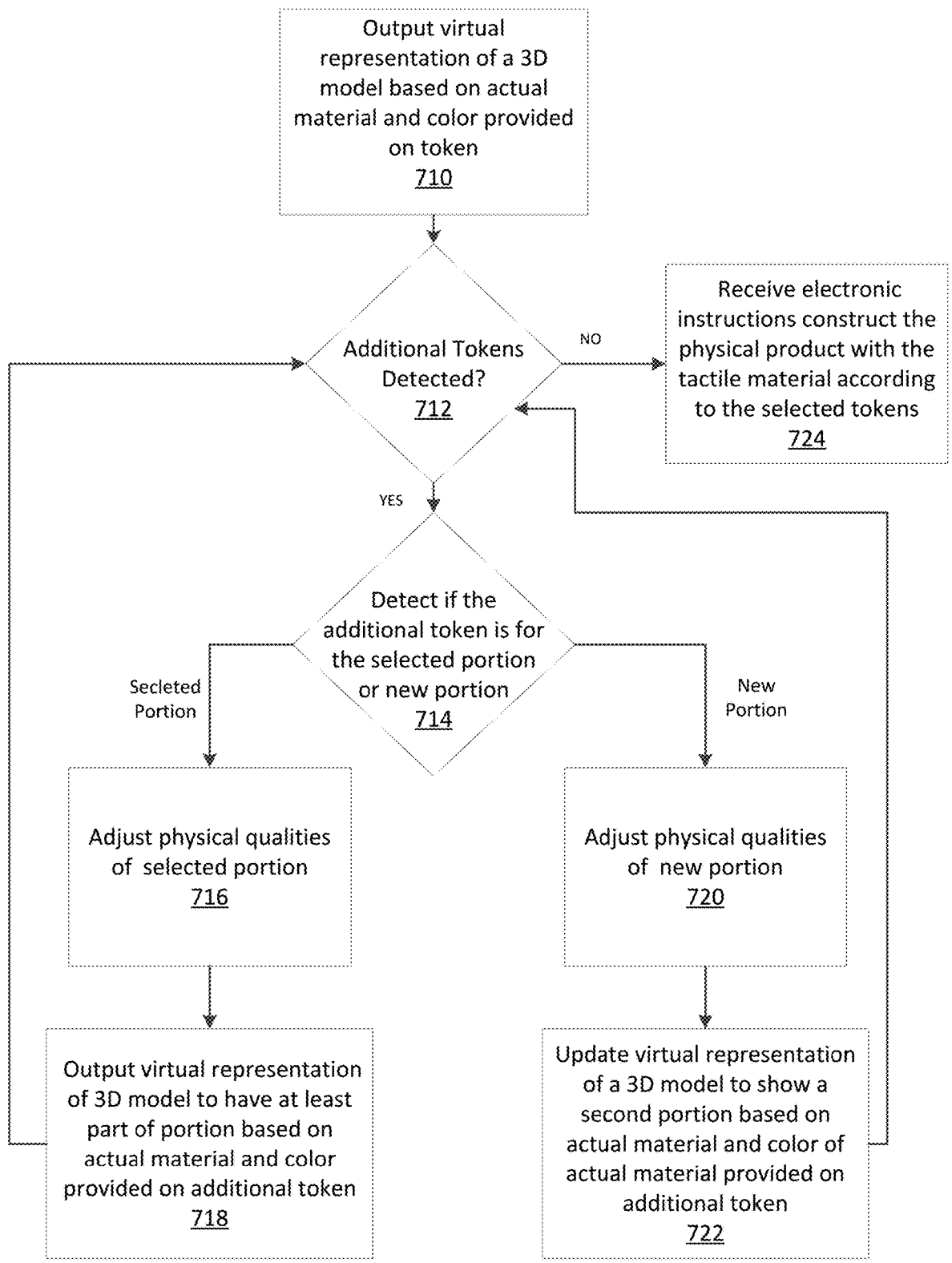

FIGS. 7A and 7B show an example flow diagram that may be partially or wholly implemented in one or more examples of customizing products in accordance with aspects of this disclosure. Such customization may be conducted in accordance with the discussion herein, including with reference to FIG. 8 or other later figures and examples, and as such, that disclosure should be considered with respect to the various embodiments of FIGS. 7A and 7B. As shown in FIG. 7A, a selection of a physical representation of a customizable product from a plurality of customizable products may be implemented (e.g., see block 702 of FIG. 7A). Either as part of this or another implementation, a plurality of molds may be provided to be selectively chosen by the user and the system may receive an electronic indication that the user has selected a first mold from the plurality of molds (e.g., see blocks 702.02 and 702.04 of FIG. 7A, which may occur as subparts of block 702 or individual aspects). As used herein the molds may be physical reproductions similar or identical to one available final product. In yet other embodiments, they may be abstract representations that cannot be worn or properly utilized in at least one function that is available for the final product being built or designed. In one embodiment, the molds may be different sizes and the user may selectively wear or otherwise see which mold or device fits the best, is more comfortable or otherwise is preferred. For example, in one embodiment, the mold or device may relate to a customizable shoe and at least a portion of the molds are of different sizes. In one such embodiment, the indication of a selected mold may provide an identification of a size being chosen. This may be especially advantageous for products like shoes in which different styles often have size variations. Thus, unlike prior art methodologies and systems, certain embodiments disclosed herein may be utilized to generate a product that allows a better or improved fit for the user. Other embodiments may have different features or materials, such as a certain material that contacts the user (e.g., a wearable device) or cushioning (e.g., a sole or cushioning member) that allows the identification of such components to be automatically conveyed to the system, either with or without the user's explicit knowledge.

Physical tokens may be provided (e.g., see block 704). In one implementation, each token has a tactile material. In some aspects the tactile material may be on a first surface or side of the token. The tactile material may be a first color. The first token having a tactile material may be detected by one or more sensors (e.g., see, e.g., block 706). In some embodiments, the token may be detected when it is within a threshold proximity of a transceiver or a sensor. In yet another embodiment, an image capturing device may be utilized. Those skilled in the art will appreciate other sensors may be used. Upon detecting the first token the method may determine the user has selected the tactile material of the first token as the first actual material to be used in building a portion of an on-demand physical product (e.g. block 708). A virtual representation of a three-dimensional model may be provided (e.g., block 710). The output may be provided on a display device, yet in other embodiments, a printer, either 3D or 2D capable, may be utilized. The representation is generated based on the actual tactile material provided on the token or tokens. The virtual representation may also be based on a color associated with the token, which may include a color actually provided on the tactile material and/or a color on the token. Checks for additional detected tokens may be performed (e.g., decision 712). If no additional token is detected, electronic instructions may be sent to construct the physical product with the tactile material according to the selected token(s) may be initiated (e.g., block 714).

If at block 712 additional tokens are detected, the decision may determine if the first additional token is for the currently selected portion of the product or a new portion of the product shown at decision 714. If it's determined that it's the currently selected portion, block 716 show that aspects may adjust the physical qualities of the selected portion of the product based on the tactile material and color of the first additional token. In aspects the display may output a virtual representation of the model having at least part of the selection portion based on the actual material and color provided on additional token. The system may then determine again if there's an additional token shown at decision 712. to determine if additional tokens are detected. If at decision 712 the additional token detected is for a new portion of the product the system may adjust the physical qualities of the new portion of the product based on the tactile material and color of the first additional token as shown at block 720. The system may then output a three-dimensional virtual representation of the model having at least part of the new portion based on the actual material and color provided on additional token as shown at block 722. The system may then determine again if there's an additional token shown at decision 712.

In different aspects the method may present a user with a plurality of product molds with each mold representing a different style of a same product type. For example, each mold may represent a different style of shoe. In other aspects each mold may represent a different size product, such as different shoe sizes. Each mold may comprise an embedded transmitter which may be configured to transmit identification information of the mold to a transceiver. The method may detect a first product mold when the first mold is within a threshold proximity of the transceiver. The method may then determine that the user has selected the first product mold based on its proximity to the transceiver. The method may determine to physically and automatically provide the user with a portion of plurality of token. Each token may comprise a first side comprising a tactile material. In some aspects the tactile material may be an actual material available for constructing a real-time virtual representation of the product type. In some aspects the virtual representation may be configured to reflect a physical product for on-demand construction at the user's instruction with the actual material; In some aspects a transmitter may be configured to automatically transmit an identification of the token to a product building interface. The method may detect a first token within a proximity of a sensor and determine that the user has selected the first actual material for a first portion of the physical product. The method may output on a display device a virtual representation of a model based on the user's selection of the first mold and the first token. The system may then receive electronic instructions from the user to construct the physical product with the tactile material on the first side of at least the first token.

In some embodiments the different aspects may be performed by an apparatus, in which the apparatus includes a processor, a transceiver configured to receive wireless signals, a display device configured to output visual representations of physical products, an input device configured to receive user inputs to alter one or more aspects of the visual representations, and a non-transitory computer readable medium comprising computer-executable instructions. The processor may be configured to execute the computer readable instructions, such that the instructions may receive at the input device a user selection of a first customizable product. The first customizable products may be selected from a plurality of customizable products. In response to receiving a user selection of a first customizable products, the processor may determine to automatically provide the user with a plurality of physical tokens. Each of these physical tokens may comprise a first side having a tactile material such that the user may have a tactile experience while touching the first side. The tactile material may be an actual material in a first color available for constructing at least a part of a real-time virtual representation of the customizable product. In some aspects the virtual representation may be configured to reflect a physical product for on-demand construction at the user's instructions with the actual material. A product building interface may be configured to receive an electronic identification of the token. The apparatus may detect a first token of the plurality of tokens within a threshold proximity of a sensor. In response to this detection, the processor may determine that the user has selected a first actual material for a first portion of the on-demand physical product. The apparatus may then output on the display device, a virtual representation of a model based on the user's selection of the first product and the first token. The user will have both a tactile experience of the actual material to be used in a first color as well as a virtual representation of the actual material in depiction of the first color on the selected first customizable product. The apparatus may then receive electronic instructions from the user to construct the physical product with the first portion comprising the tactile material on the first side of at least the first token.

In some aspects the method may receive from a user a selection of a first product mold representing a first customizable product from a plurality of customizable products. In some embodiments each of the molds may comprise an embedded transmitter which may transmit identification of the mold to a transceiver. In some aspects the method may receive a user selection of a first portion of the product and in response provide the user with a plurality of physical tokens associated with the first portion of the product. In some embodiments each of the tokens may comprise a first side comprising a tactile material where the tactile material is an actual material available for constructing a real-time virtual representation of the product type with the selected first product mold. The virtual representation may be configured to reflect a physical product for on-demand construction based upon the user's instructions with the actual material. A transmitter may be configured to automatically transmit an identification of the token to a product building interface. The method may detect a first token of the plurality of tokens within a threshold proximity of a sensor. In response to detecting a first token within a threshold proximity of a sensor, a processor may determine that the user has selected the first actual material for the first portion of the physical product. The method may then output on a display device a virtual representation of a model based on the user's selection of the first mold and the first token.

In some embodiments the plurality of tokens may be a first plurality of tokens that are each configured to permit the user to selectively customize a first portion of the physical product. In some examples the user may be provided with a second plurality of tokens where the second plurality of tokens are each configured to permit the user to selectively customize a second portion of the physical product. As examples, the user may be able to selectively customize portions of a shoe, such as the upper, lower, midsole, heel, tongue, laces, or traction. In some embodiments the first plurality of tokens may permit the user to selectively customize a first of these portions as a first portion and the second plurality of tokens may permit the user to selectively customize a second of these portions as a second portion.

In some examples the available tokens from the second plurality of token may be dependent on the user's selection of a first token for the first portion of the product. If a user has selectively customized a first portion of the physical product a portion of the second plurality of tokens may be deactivated. In this example the available options for customizing a second portion of the product may be dependent on what the user has selected for customizing the first portion of the product. As one example, if a user selects a particular tactile material for the first portion of the product the user's options for the tactile material for the second portion of the product may be limited. For example, if the user selects the first tactile material for first portion of the product to be a knit upper, the tokens in the second plurality of tokens that have leather as their tactile material may be deactivated.

In some examples the user may select a first criteria that may limit the tokens provided to the user. For example, the user may select a price limit for the customizable product. In response, the user may only be provided with tokens comprising actual tactile materials that if constructed would cost less than the user selected price limit. In this manner, the user will not be presented with tokens that if chosen would cause the product to be outside of the user's price range. The user is therefore able to choose tokens and customize the product while knowing that the final selected product will be within their budget. In some aspects this criterion may apply to multiple selections. For example, if a user inputs a price limit as a first criteria and then chooses a first tactile material for a first portion of the product, in some embodiments the system may deactivate tokens from the second plurality of tokens that if chosen would cause the product's price to go over the limit. In different aspects the first criteria may be price point, product size, product style, and combinations thereof. For example, a user may select that they only want to see tokens that are available for a size 10 shoe that would cost under $150. The user may only be presented with tokens having tactile materials that are currently available for a size 10 shoe and that if selected would cost less than $150.

In certain embodiments the user may be able to change the color of a portion of the product without changing the tactile material. The user may select the tactile material and color for a first portion of the product which will be displayed as a virtual representation. In some aspects the user may be prompted to choose a second color or replace the first color without changing the actual material. In other aspects the user may be able to change the tactile material without changing the first color. In certain aspects the instructions to change the color are automatically received based upon reception of a token having a first side or a second side providing a color depiction that is different than the currently selected color.

In some aspects the transceiver may be an RFID. The detection of the first token within a threshold proximity of the sensor may occur when the first token is detected the within a threshold proximity of the transceiver. In some examples the threshold proximity may be a centimeter, five centimeters, one to ten centimeters, one inch, two inches, three inches, more than inch, less than five inches, or any other threshold distance.

In some aspects the identification of the mold may comprise a size of the product. In some embodiments determining to physically and automatically provide the user with only a portion of a plurality of physical tokens is based on a criterion. In some examples this criterion may include information from material supply chains, virtual point systems, user price point preferences, a type of mold selected, or any other input or aspect desired by a user or the seller.

Figure 8:
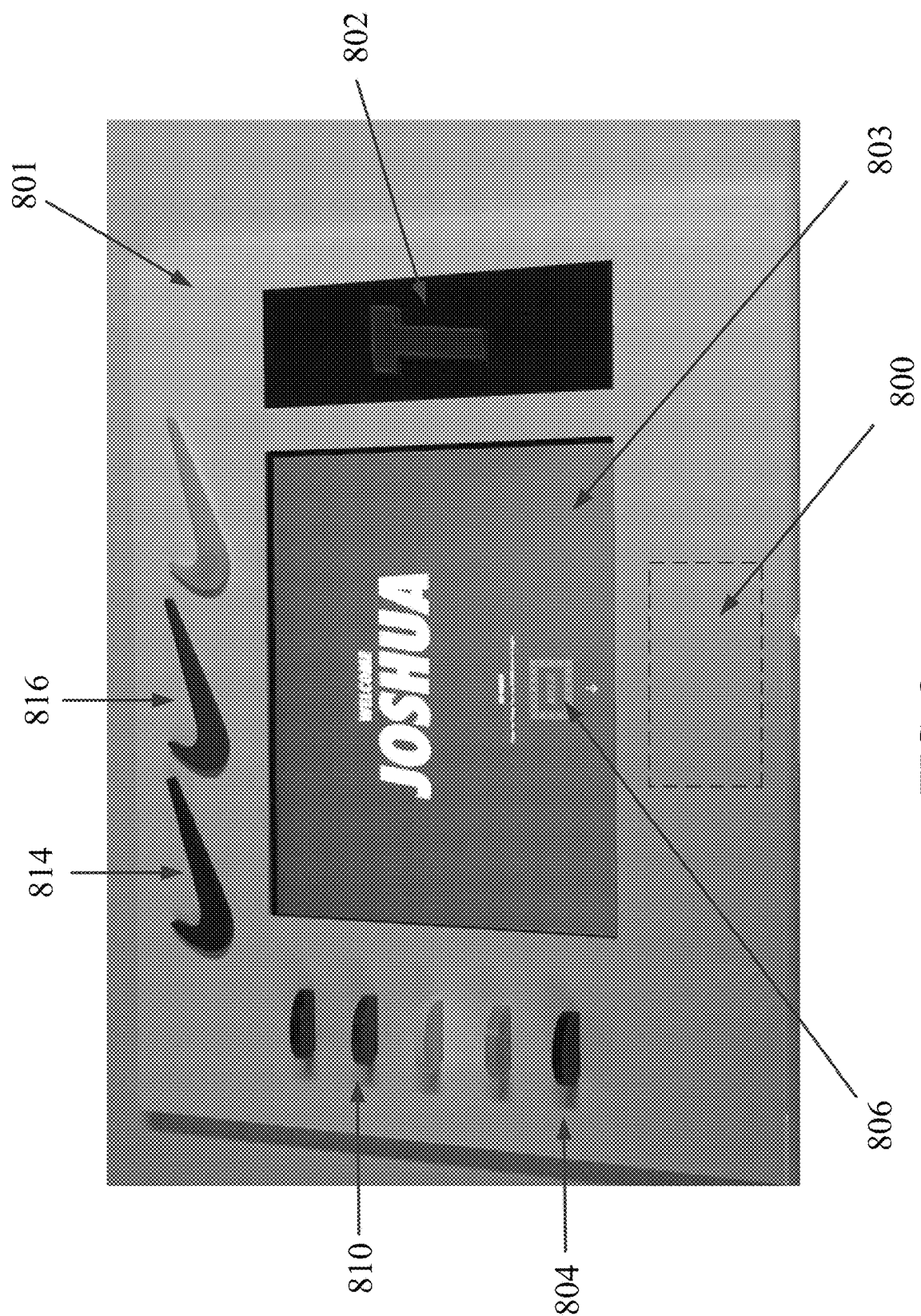
FIGS. 8-12 illustrate various exemplary components and interfaces of a computing device for customizing products in accordance with various aspects of the present disclosure.

FIG. 8 illustrates a computing device 801 for customizing products in accordance with various aspects of this disclosure. In an embodiment, a user may activate computing device 801 by touching screen 803. Upon activation, screen 803 may display a welcome screen such as "Welcome Joshua" as illustrated in FIG. 8. In an embodiment, the welcome screen may be device specific or may display a screen associated with the last know user. In some embodiments, a user may have to log into the device in order to access the welcome screen. a user sign-in interface screen which may ask a user for a NIKEiD, unique identifier or other identifying information 806. In an embodiment, the system may provide the user with a keyboard display and may be further configured to receive user input indicating the user's unique identifier and/or password. In other embodiments, screen 803 may include a fingerprint sensor, and a user may be prompted to scan their respective fingerprint via the screen 803 such that the user's identity may be authenticated by computing device 801. As shown in FIG. 8, a portion 800 of computing device 801 may include a wireless communication channel, such as an NFC reader, such that the computing device may wireless receive data from another computing device and/or sensor.

In some embodiments, the system may include a component 802 configured to operatively communicate with computing device 801. In some aspects of the present disclosure, component 802 may comprise an electronic component. As will be explained in more detail below, a user may utilize component 802 to launch a design session via computing device 801. In some aspects of the present disclosure, a previously saved product design may be displayed in screen 803. In other aspects of the present disclosure, the user may be presented with a base design for a product on screen 803. In some embodiments, the component 802 may be programmed to store a personalized access code unique to the user. In some of these embodiments, the component 802 may be configured to transmit the access code to the computing device through communication channel 800. In some instances, a user may utilize the component 802 to log into their NIKEiD account. In some aspects of the invention a user may be furnished with a personal component (e.g., component 802) such that the user may use their personal component to launch design sessions at computing devices (e.g., computing device 801) that are sited in various locations, such as a retail store.

As shown in FIG. 8, the product customization system may include one or more tokens, such as tokens 804 and 810, which may be configured to operatively communicate with any computing device disclosed herein, including for example, computing device 801. As used herein the term "token" is not limited to any particular size, shape or other spatial restriction. Rather, the term "token" is used to denote a physical item that the user may selectively use to interact with a computing device and further includes at least one material positioned to be felt by the user to provide a tactile experience. In some aspects of the present disclosure, a token may comprise an electronic component or device. As will be explained in more detail below, a user may utilize a token or tangible item to create, design and/or modify the design of a physical product. The product to be built or modified may be virtually represented, such as for example, displayed on a display device, such as on screen 803. Tokens may contain all features discussed herein. In some aspects of the present disclosure, the token may be manufactured in a variety of shapes, colors, and sizes. In one embodiment, a first plurality of tokens may be a first shape, size, color or otherwise distinguishable in appearance and/or tactile properties from a second plurality of tokens. The first plurality may be configured to permit the selective creation, design, and/or adjustment of a first portion of the product, that is different than from a second plurality of tokens. The token may be multi-dimensional, and thus have at least two sides. In one embodiment, at least one side (or surface) may comprise a tactile material which the "tactile" refers to the material being provided to allow a user to selectively feel or touch it. In certain embodiments the tactile material associated with a token may be leather, knit, canvas, cotton, polyester, spandex, or combinations thereof. In some aspects of the present disclosure, tokens may be purchased, given, earned, or acquired separately from a retailer or other source. In one embodiment, a user may receive tokens for achieving certain activity goals, milestones, and various other activity or fitness-related accomplishments.

Using tokens in the embodiments described herein also advantageously enables a simplified user interface and system. Specifically, the color may be received directly from the token which comprises the actual color selected and is visually accessible to the user in a physical tangible manner. The system does not require the user to even "select" what they believe the corresponding or correct color (or related color code is). In this regard, various user settings on different display devices, lighting conditions or other variables are not problematic when requiring users to select or confirm specific colors (or even materials). Therefore, in certain aspects, the systems and methods prevent user errors which may arise where the user selects a color which is not in fact that shown in for example of prior art swatches. In yet other embodiments, errors may be prevented when a color is selected that would appear different on the actual material being utilized with the selected color.

As will be explained in more detail below, a characteristic of the token (e.g., tactile material and/or color) may be utilized to indicate how the token may be utilized to customize a product design. For example, a yellow token may be utilized to modify a portion of a product design to be yellow. In this regard, the color may actually be that specific color. Unlike other methods, the user can actually observe (perhaps under different lighting conditions) the actual color to be used instead of a virtual representation of the color, which may not be accurately reflected on virtual displays, due to a plurality of reasons, such as for example, user settings, differing materials, or others. In one implementation, a token may comprise a tactile material. The tactile material may be an actual material available for constructing the physical product. In some aspects the tactile material may be, but not limited to: leather, knit, canvas, cotton, polyester, spandex, or combinations thereof. The color may be provided on the actual tactile material, such that the color is depicted accurately on the material to be used on the product, thus correctly showing the user one or more characteristics, such as reflectivity, saturation, hue, and/or others. The tactile material may be configured to modify a portion of a product design to be an actual material used in the construction of the actual physical product. Additionally or alternatively, the product customization system may include one or more design objects, such as design objects 814 and 816, which may be configured to operatively communicate with computing device 801. In some aspects of the present disclosure, a design object may comprise an electronic device. The design object may be manufactured in a variety of shapes and sizes. For example, as shown in FIG. 8, design objects 814 and 816 comprise a "swoosh" shape. In other embodiments, a design object may comprise a different shape, such as a rectangle, a square, the shape of a shoe, and the like. In some embodiments, when customizing a product design during a design session, a user may utilize object components 814 and 816 to access particular color-ways for a shoe design, to access limited edition and/or exclusive product designs.

Figure 9:
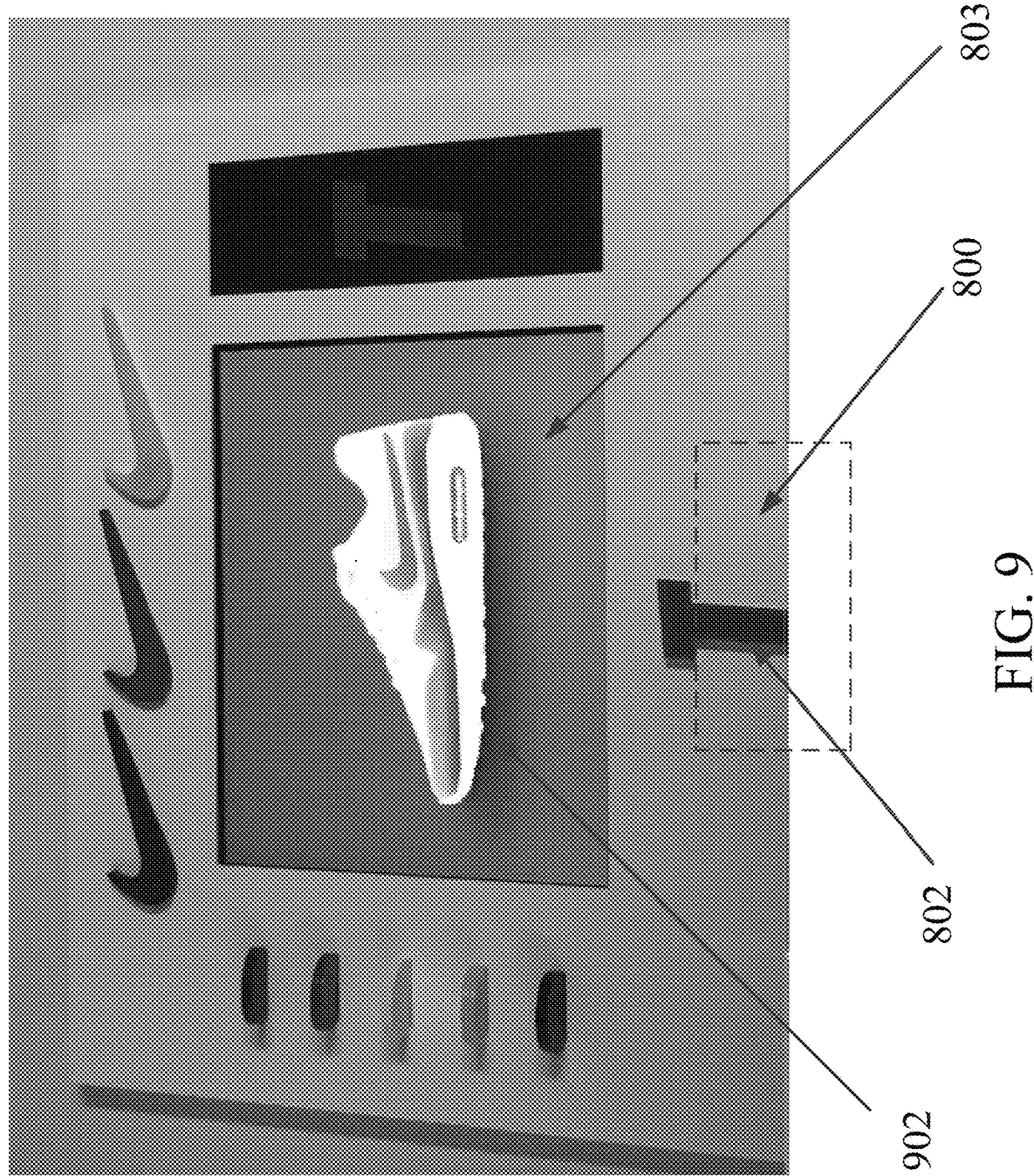

FIG. 9 illustrates an example user interface screen for a user design session. As noted above, if desired, a design session (which may be used to create, design, and/or modify a product) can be launched directly from a display device, such as screen 803 as shown in FIG. 8, without the need for user input of a user name, password, or other additional information, without departing from the scope of the present disclosure. This may be done, for example, by placing component 802 within a threshold proximity to communication channel 800. As noted above, component 802 may be configured operatively communication with computing device 801 to access a user's account, such as for example, a NIKEiD account and/or user profile. Additionally or alternatively, component 802 may be configured to launch a design session for the user.

As shown in FIG. 9, by component 802 being selectively utilized, such as for example, being positioned within a threshold proximity to communication channel 800, a computing device, such as any computing device disclosed herein, for example, device 801 may receive an electronic signal to initiate and/or modify a session. In one embodiment, component 802 may transmit control signals to computing device 801 to launch a design session. In some aspects of the present disclosure, a previous shoe design customized by a user may be displayed in display screen 803. In other aspects of the present disclosure, a user may be provided an interface to select from a plurality of saved product designs to further customize. In other aspects of the present disclosure, the system may provide the user with a plurality of base product designs for the user to customize. As shown in FIG. 9, after launching the design session, screen 803 displays a saved footwear design (e.g., design 902) that has been previously designed by a user.

Figure 10:
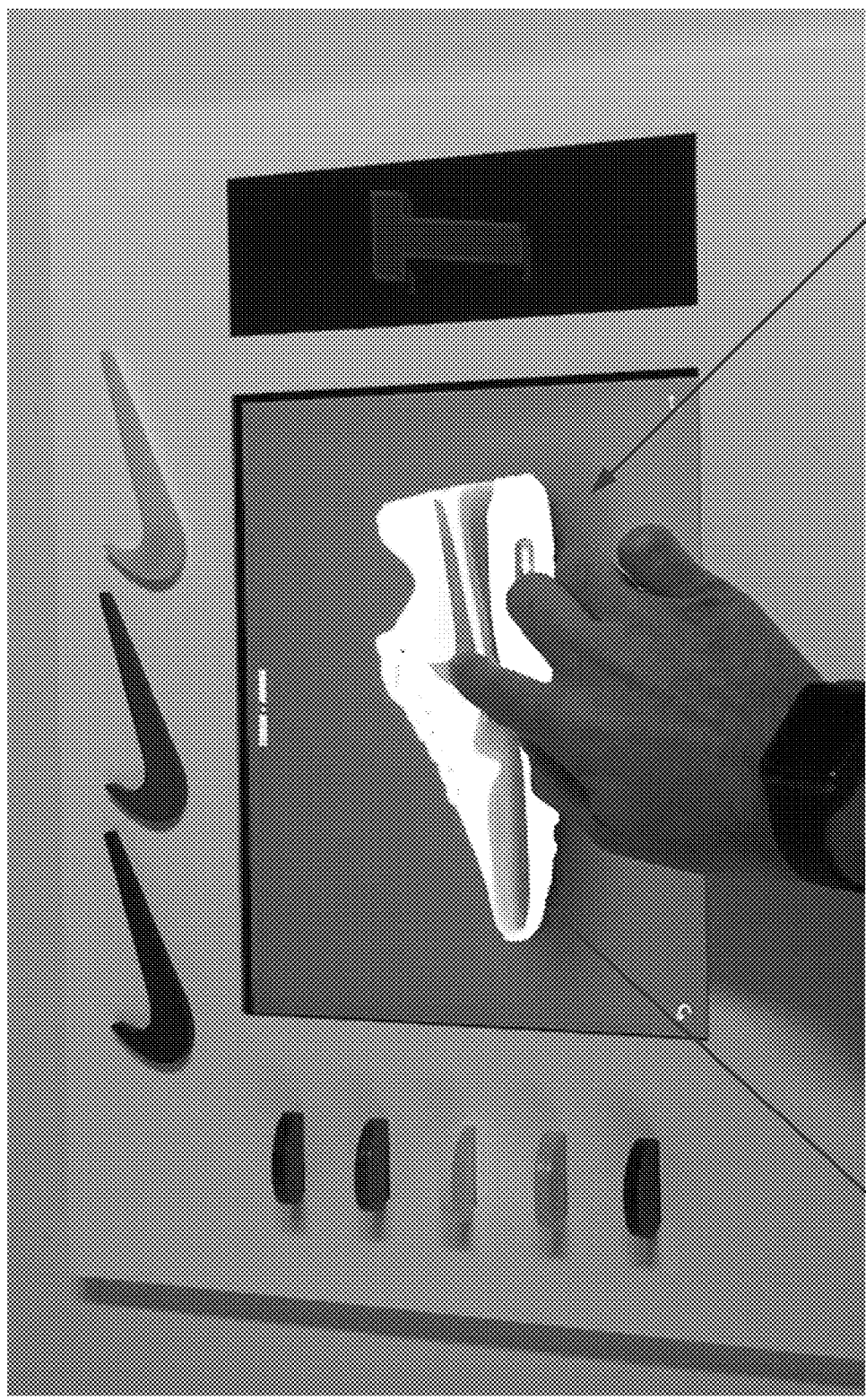

As shown in FIG. 10, screen 803 may display a current product design for a design session initiated by a user. In some aspects of the present disclosure, a user may quickly access different product designs to customize by one or more inputs, including but not limited to performing a predetermined input gesture on screen 803. For example, the user may swipe the screen 803 in a predetermined direction to access a different product design (or design template). A user may be able to distinguish between the various product designs via a unique name or session identifier attributed to each product design. A variety of other inputs, such as gestures or even sensor inputs via a token or other communication channels, may be received.

Figure 11:
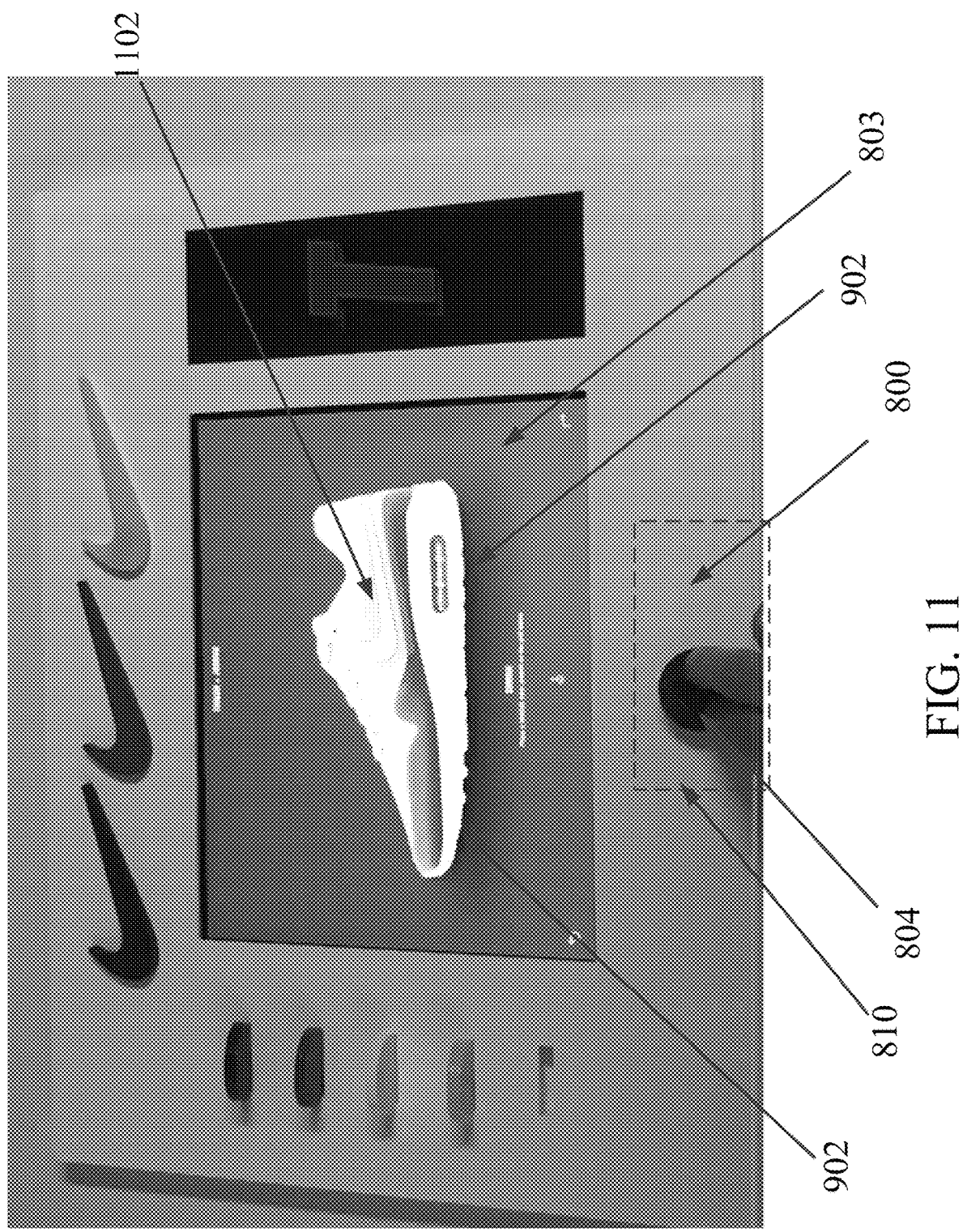

Changes to various selected portions of the product design may be made in any desired manner without departing from the scope of this disclosure. For example, as show in FIG. 11, a user might "select" some specific part of the shoe design (e.g., the heel reinforcement, a visible portion of the midsole, a portion of the outsole, the tongue, eyelets, laces, toe cap, tread elements, swoosh, etc.). Or the system may be designed to select various portions of the product to be physically built. Whether initiated wholly or partially by the user or another initiating condition, the selection of a specific portion or component (or sequence of selections) may be based upon a script (e.g., embodied as a non-transitory computer-readable medium comprising computer-implemented instructions that when executed by a processor, cause the processor to perform a sequence of events, which may be conditional on certain criteria or wholly predetermined). In certain embodiments, a script or other electronic sequences performed by a processor based upon executing computer-executable instructions may be implemented or augmented based upon the previous and/or anticipated conditions, selections or interactions with the system. In one embodiment, the selection of a portion of a product to be built (or a component thereof) may be based upon a sensor input, which may be received from the detection or reception of a product mold, token and/or any other item being detected, such as within a threshold range. Thus, as used herein, the "selection" of a portion or component encompasses the indirect and direct selection, which may be partially or wholly automated. In another embodiment, such as the example shown in FIG. 11, the user may select a desired portion of the shoe design (e.g., portion 1102) to begin creating, designing, or customizing the selected portion 1102 of the shoe. Interface elements may also be provided, such as for example, on screen 803 to allow user selection of and changes to parts of the article of footwear that may not be fully or even partially-visible after construction of the physical product, such as for example, fluid-filled bladders, plates in the sole, internal electronic components, amongst others. Once selected, the user can make changes to that element. In some embodiments, once a portion of the represented design is selected, the portion of the design may be visually emphasized to indicate the user selection. For example, the selection of a portion of the shoe design may cause the interface screen to highlight the selected portion of the design in some manner, such as by enlarging it, coloring it differently, or by bolding the external boundary of it.

Figure 12:
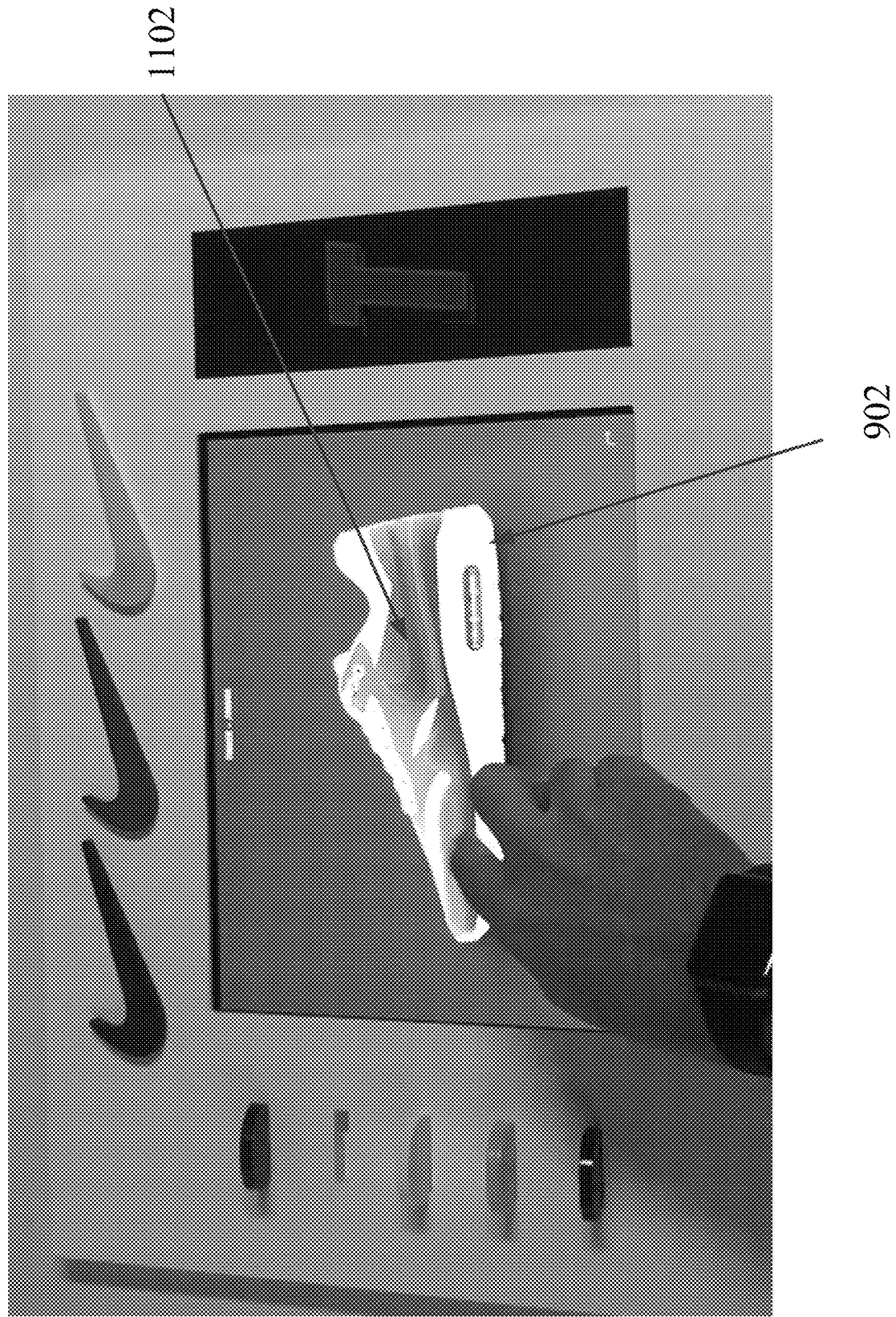

FIG. 12 illustrates a process for adjusting a feature of a product design via a computing device, such as for example computing device 801. For example, to change a color and/or tactile material for a portion of the shoe design, a user or condition may cause the selection of a desired portion of the shoe design (e.g., portion 1102) that the user is able to selectively customize. The selection may be made, however, upon the detection of one or more tokens within a threshold distance or other condition. As shown in FIG. 12, after a desired portion of the product design (e.g., portion 1102) has been selected, the portion may be visually emphasized to indicate that the portion has been selected for customization. In other examples, the selected portion of the product design may oscillate between a previously selected color and a second color (e.g., white) to emphasize that the portion of the design is selected.

Figure 13:
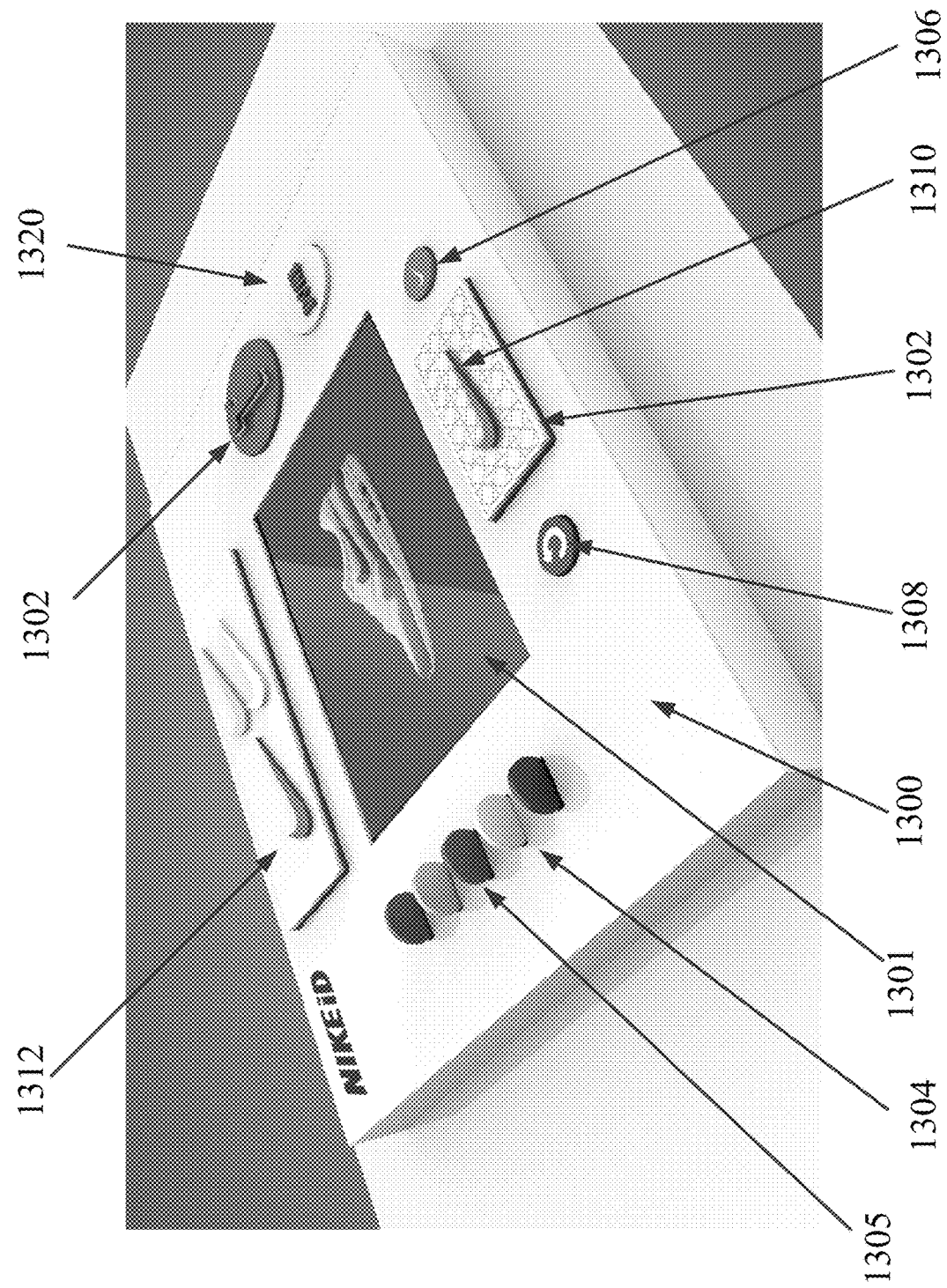
FIG. 13 illustrates an exemplary embodiment of computing devices for customizing products in accordance with various aspects of the present disclosure.

In some embodiments, as shown in FIG. 13, computing device 1300 may include a control button 1308 that is configured to provide the user with additional editing features during a design session. In some embodiments, by selecting button 1308, the user may be presented with an editing menu that provides the user with various options for editing the current product design, which may be virtually represented, such as via screen 1301. In other embodiments, the button 1308 may be configured to execute a particular editing feature, such as a "undo" function to eliminate the last design action by the user, a "redo" function to re-do a previously erased action, and the like.

As shown in FIG. 13, a portion 1302 of computing device 1300 may include a wireless communication channel, such as but not limited to those disclosed herein, such that the computing device may wireless receive data from another computing device and/or sensor. In one embodiment, the wireless channel includes an NFC (near field communication) or RFID (radio frequency) channel. Similar to computing device 801, computing device 1300 and/or any other computing device may utilize tokens (e.g., tokens 1304 and 1305) and object components (e.g., components 1310 and 1312) to customize various aspects of a product design. Various additional potential features and functionality may be included in systems, methods, and user interfaces in accordance with at least some examples of this invention. For example, a personalized message or identifier may be placed on the shoe design. Users can launch this "personalized message" feature by selecting button 1306. Additionally or alternatively, the user may add a personalized image, icon, or other feature to a product design by selecting button 1306. In other embodiments, the user may be provided with a menu or other interface in screen 1301 to add a personalized message, photo, icon, or other feature to a current shoe design.

As an additional potential feature, systems, methods, and computer interfaces in accordance with at least some examples of this invention may allow the user to get "inspiration" during the design or customization process by selecting element 1302. While any desired information may be provided in response to user interaction with element 1302 of the computing device, in some examples, the systems, methods, and computer interfaces may display to the user information such as: a display of one or more other user designs of the same product (or a selected portion of the product); a display of one or more other user designs of a product (or a selected portion of a product) having the same or similar uses, characteristics, or functions; a display of one or more other user designs by users with similar tastes or interests (e.g., same favorite sports team, same favorite recreational activities, etc.); users from the same geographical region; users from the same age group; users from the same profession; etc.); suggestions for different colors or color combinations that might match well with existing portions of the design (e.g., complementary colors); information regarding popular colors or color combinations for one or more portions of the design (e.g., from previously designed products or inventory); and/or any other desired information (including information relating to the specific product or product line or other interesting designs or inspiring information). Element 1302 also may include functionality to allow the user to immediately purchase the customized product at any time during the design process. In still other embodiments, element 1302 may include functionality to allow the user to communicate with a product design expert, friend, or stylist that may help the user in creating the custom designed product or provide feedback and suggestions on an existing design. The expert, friend, or stylist may consult with the user in any suitable manner (i.e., via text messaging, video conferencing, and the like). In other embodiments, element 1302 also may include functionality to generate an electronic file (e.g., a gif., wav., etc.) that includes a signature or other customization feature associated with a particular celebrity, athlete, shoe designer, or other famous person.

As shown in FIG. 13, computing device 1300 may include an element 1320 that allows a user to electronically save the current product design (and/or an image of the current product design). For example, an electronic file containing the image of the custom design may be saved for personal use by the user that created it or may be available for use by other users. In other aspects of the present disclosure, the user may send a copy of the customize design to one or more communication addresses associated with the user. Additionally or alternatively, the user may save the customized design to a specified user profile or user account.

Furthermore, the present application extends to the subject-matter described in the following numbered clauses in paragraphs 79-94:

Clause 1: An apparatus configured to generate a customized object comprising:
 a processor;
 a transceiver configured to receive wireless signals;
 a display device configured to output visual representations of physical products;
 an input device configured to receive user inputs to alter one or more aspects of the visual representations;
 a non-transitory computer readable medium comprising computer-executable instructions that when executed by the processor, perform at least:
  receive, at the input device, a user selection of a first customizable product from a plurality of customizable products;
  in response, determining with the processor, to automatically provide the user with a plurality of physical tokens, each of the tokens comprising:
   a first side comprising a tactile material provided such as to permit the user to have a tactile experience when touching the first side, the tactile material being an actual material in a first color available for constructing at least a part of a real-time virtual representation of the customizable product, and wherein the virtual representation is configured to reflect a physical product for on-demand construction at the user's instructions with the actual material; and
   an electronic identification of the token configured to be electronically received by a product building interface;
  detecting a first token of the plurality of tokens within a threshold proximity of a sensor, and in response, determining with the processor that the user has selected a first actual material for a first portion of the on-demand physical product;
  in response, outputting on the display device, a virtual representation of a model based on the user's selection of the first product and the first token, thereby providing the user with a tactile experience of the actual material to be used in a first color as well as a virtual representation of the actual material in depiction of the first color on the selected first customizable product; and
  receiving electronic instructions from the user to construct the physical product with the first portion comprising the tactile material on the first side of at least the first token.

Clause 2: The apparatus of clause 1, wherein the plurality of tokens is a first plurality of tokens that are each configured to permit the user to selectively customize a first portion of the physical product, and wherein the computer-readable medium further comprises computer-executable instructions that when executed by the processor, cause the processor to perform at least:
  providing a second plurality of tokens for use, wherein the second plurality of tokens that are each configured to permit the user to selectively customize a second portion of the physical product.

Clause 3: The apparatus of clause 1 or clause 2, wherein the computer-readable medium further comprises computer-executable instructions that when executed by the processor, cause the processor to perform at least:
  deactivating a portion of tokens upon detecting a user has selectively customized a portion of the physical product.

Clause 4: The apparatus of any of clauses 1-3, wherein the transceiver comprises an RFID transceiver.

Clause 5: The apparatus of any of clauses 1-4, the computer-readable medium further comprising computer-executable instructions that when executed cause the processor to perform at least:
  receiving a user selection of a second color to replace the first color without changing the actual material.

Clause 6: The apparatus of any of clauses 1 and 3-5, wherein the plurality of tokens is a first plurality of tokens that are each configured to be selectively used by the user to customize a first portion of the physical product, and the apparatus further comprising:
  a second plurality of tokens that are each configured to be selectively used by the user to customize a second portion of the physical product;
  wherein the computer-readable medium further comprises computer-executable instructions that when executed by the processor, cause the processor to perform at least:
  determining to not provide the user at least one token from the second plurality of tokens for use.

Clause 7: The apparatus of any of clauses 1-6, the computer-readable medium further comprising computer-executable instructions that when executed by the processor, cause the processor to perform at least:
  receiving at the input device, a user selection of a first criteria associated with the first customizable product selected by the user; and
  providing the user only with the physical tokens from the plurality of physical tokens that match the first criteria.

Clause 8: The apparatus of clause 7, wherein the first criteria is selected from the group consisting of price point, size, product style, and combinations thereof.

Clause 9: The apparatus of any of clauses 1-8, wherein the tactile material is selected from the group consisting of: leather, knit, canvas, cotton, polyester, spandex, and combinations thereof.

Clause 10: A computer-implemented method comprising:
  presenting a user with a plurality of product molds, each representing a different styles of a same product type, wherein each of the molds comprises an embedded transmitter configured to transmit identification of the mold to a transceiver;
  detecting a first product mold of the plurality of molds within a first threshold proximity of the transceiver, and in response, determining with a processor that the user has selected the first product mold;
  in response, determining to physically and automatically provide the user with only a portion of a plurality of physical tokens, each of the tokens comprising:
    a first side comprising a tactile material, the tactile material being an actual material available for constructing a real-time virtual representation of the product type with the selected first product mold, and wherein the virtual representation is configured to reflect a physical product for on-demand construction at the user's instructions with the actual material; and
    a transmitter configured to automatically transmit an identification of the token to a product building interface;
  detecting a first token of the portion of tokens within a threshold proximity of a sensor, and in response, determining with a processor that the user has selected the first actual material for a first portion of the physical product;
  in response, outputting on a display device, a virtual representation of a model based on the user's selection of the first product mold and the first token; and
  receiving electronic instructions from the user to construct the physical product with the tactile material on the first side of at least the first token.

Clause 11: The method of clause 10, wherein the portion of a plurality of tokens is a first portion of tokens, and each relate to a first portion of the physical product, wherein based upon a confirmation of the actual material and color of the first portion, a second portion of the plurality of tokens is provided for use, wherein the second portion of tokens each relate to a second portion of the physical product.

Clause 12: The method of clause 11, further comprising:
  receiving instructions to change a color of the tactile material for the virtual representation of the product.

Clause 13: The method of clause 11 or 12, wherein the instructions are automatically received based upon reception of a token having a first side or a second side providing a color depiction that is different than the currently selected color.

Clause 14: The method of any of clauses 11-13, wherein the identification of the mold comprises a size of the product.

Clause 15: The method of any of clauses 11-14, wherein the determining to physically and automatically provide the user with only a portion of a plurality of physical tokens is based on a determination selected from the group consisting of: material supply chains, virtual point systems, user price point preferences, a type of mold selected, and combinations thereof.

Clause 16: The method of any of clauses 11-15, wherein the tactile material is selected from the group consisting of: leather, knit, canvas, cotton, polyester, spandex, and combinations thereof.

What is claimed is:

1. An apparatus comprising:
  one or more processors;
  a transceiver that receives wireless signals transmitted from one or more tokens;
  a display device that outputs visual representations of products;
  an input device that receives user inputs to alter one or more aspects of the visual representations;
  a non-transitory computer-readable medium comprising computer-executable instructions that when executed by the one or more processors, cause the apparatus to:

receive, at the input device, a user selection of a first product mold representing a first customizable product from a plurality of customizable products, wherein the plurality of customizable products comprise at least on of: an article of footwear, an article of apparel, or a piece of athletic equipment;

detect a first physical token of a plurality of physical tokens within a threshold proximity of the transceiver, wherein each physical token comprises:

a first side comprising a tactile material that permits a user to have a tactile experience when touching the first side, the tactile material being an actual material in a first color available for generating a display of a virtual representation of the customizable product, and wherein the virtual representation indicates products for on-demand construction at the user's instructions with the actual material; and an electronic identification of the physical token that is electronically received by a product building interface;

determine that the user selected a first actual material for a first portion of the first customizable product;

in response to determining that the user selected the first actual material, output, on the display device, a virtual representation of a model based on the user's selection of the first customizable product and the first physical token, thereby providing the user with a tactile experience of the actual material to be used in a first color as well as a virtual representation of the actual material in depiction of the first color on the selected first customizable product; and receive electronic instructions from the user to construct the first customizable product with the first portion comprising the tactile material on the first side of at least the first physical token.

2. The apparatus of claim 1, wherein the plurality of physical tokens is a first plurality of physical tokens that permit the user to selectively customize a first portion of the first customizable product, and wherein the non-transitory computer-readable medium further comprises computer-executable instructions that when executed by the one or more processors, cause the apparatus to:

detect, via the transceiver, a second plurality of physical tokens for use, wherein the second plurality of physical tokens permit the user to selectively customize a second portion of the first customizable product.

3. The apparatus of claim 2, wherein the non-transitory computer-readable medium further comprises computer-executable instructions that when executed by the one or more processors, cause the apparatus to:

deactivate a set of physical tokens, of the second plurality of physical tokens, based on user input indicating at least one of: material supply chains, virtual point systems, user price point preferences, or a type of mold.

4. The apparatus of claim 1, wherein the transceiver comprises an RFID transceiver.

5. The apparatus of claim 1, the non-transitory computer-readable medium further comprising computer-executable instructions that when executed cause the one or more processors to:

receive a user selection of a second color to replace the first color without changing the actual material.

6. The apparatus of claim 1, wherein the plurality of physical tokens is a first plurality of physical tokens that are selectively used by the user to customize a first portion of the first customizable product, and the apparatus further comprising:

a second plurality of physical tokens that are selectively used by the user to customize a second portion of the first customizable product;

wherein the non-transitory computer-readable medium further comprises computer-executable instructions that when executed by the one or more processors, cause the apparatus to:

deactivate at least one physical token, of the second plurality of physical tokens, based on user section of a physical token from the first plurality of physical tokens.

7. The apparatus of claim 1, the non-transitory computer-readable medium further comprising computer-executable instructions that when executed by the one or more processors, cause the apparatus to:

receive at the input device, a user selection of a first criteria associated with the first customizable product selected by the user; and detect one or more physical tokens from the plurality of physical tokens that match the first criteria.

8. The apparatus of claim 7, wherein the first criteria is selected from the group consisting of: price point, size, product style, and combinations thereof.

9. The apparatus of claim 1, wherein the tactile material is selected from the group consisting of: leather, knit, canvas, cotton, polyester, spandex, and combinations thereof.

10. A computer-implemented method comprising:

detecting a first product mold of a plurality of product molds within a first threshold proximity of a transceiver, wherein each product mold represents a different style of a product type, and wherein each product mold comprises an embedded transmitter that transmits identification of the product mold to the transceiver;

in response determining that a user has selected the first product mold, detecting a portion of a plurality of physical tokens, each of the physical tokens comprising:

a first side comprising a tactile material, the tactile material being an actual material available for generating a display of a virtual representation of the product type with the selected first product mold, and wherein the virtual representation reflects a physical product for on-demand construction at the user's instructions with the actual material, wherein the physical product comprised at least one of: an article of footwear, an article of apparel, or a piece of athletic equipment; and a transmitter that automatically transmits an identification of the physical token to a product building interface;

determining a first physical token of the portion of physical tokens within a threshold proximity of the transceiver;

in response to determining that the user has selected the actual material for a first portion of the physical product, outputting via a display device, a virtual representation of a model based on the user's selection of the first product mold and the first physical token; and receiving electronic instructions from the user to construct the physical product with the tactile material on the first side of at least the first physical token.

11. The method of claim 10, wherein the portion of a plurality of physical tokens is a first portion of physical tokens, and each relate to a first portion of the physical product, wherein based upon a confirmation of the actual material and color of the first portion, a second portion of the plurality of physical tokens is detected for use, wherein the second portion of physical tokens each relate to a second portion of the physical product.

12. The method of claim 10, wherein the transceiver is an RFID.

13. The method of claim 10, further comprising:
receiving instructions to change a color of the tactile material for the virtual representation of the physical product.

14. The method of claim 13, wherein the instructions are automatically received based upon detecting user selection of a physical token having a first side or a second side providing a color depiction that is different than a currently selected color.

15. The method of claim 10, wherein the identification of the product mold comprises a size of the physical product.

16. The method of claim 10, further comprising:
deactivating one or more physical tokens of the plurality of physical tokens based on user input indicating at least one of: material supply chains, virtual point systems, user price point preferences, a or a type of mold.

17. The method of claim 10, wherein the tactile material is selected from the group consisting of: leather, knit, canvas, cotton, polyester, spandex, or combinations thereof.

18. A computer-implemented method comprising:
receiving, from a user, a selection of a product mold representing a first customizable product from a plurality of customizable products, wherein the plurality of customizable products comprises at least one of: an article of footwear, an article of apparel, or a piece of athletic equipment, and wherein the product mold comprises an embedded transmitter that transmits identification of the product mold to a transceiver;
in response to receiving a user selection of a first portion of the first customizable product, detecting a plurality of physical tokens associated with the first portion of the first customizable product, each of the physical tokens comprising:
a first side comprising a tactile material, the tactile material being an actual material available for generating a display of a virtual representation of the first customizable product with the selected product mold, and wherein the virtual representation indicates products for on-demand construction using the actual material based upon the user's selections; and
a transmitter that automatically transmits an identification of the physical token to a product building interface;
determining a first physical token of the plurality of physical tokens within a threshold proximity of the transceiver; and
in response to determining that the user has selected the actual material for the first portion of the first customizable product, outputting via a display device, a virtual representation of a model based on the user's selection of the first product mold and the first physical token.

* * * * *

UNITED STATES PATENT AND TRADEMARK OFFICE
CERTIFICATE OF CORRECTION

PATENT NO. : 10,740,501 B2
APPLICATION NO. : 15/458744
DATED : August 11, 2020
INVENTOR(S) : Singh et al.

It is certified that error appears in the above-identified patent and that said Letters Patent is hereby corrected as shown below:

In the Claims

Column 24, Claim 1, Line 60:
After "more", insert --physical--

Column 25, Claim 1, Line 5:
Delete "on" and insert --one-- therefor

Column 26, Claim 10, Line 49:
Delete "comprised" and insert --comprises-- therefor Column 27, Claim 16, Line 24:
Before "or a", delete "a"

Column 28, Claim 18, Line 2:
Delete "comprises" and insert --comprise-- therefor Signed and Sealed this
Twenty-seventh Day of December, 2022

Katherine Kelly Vidal
*Director of the United States Patent and Trademark Office*